United States Patent
Itoh et al.

(10) Patent No.: US 7,117,325 B2
(45) Date of Patent: Oct. 3, 2006

(54) RECORDING DEVICE AND RECORDING SYSTEM USING RECORDING DISK, AND BACKUP, METHOD FOR THE SAME

(75) Inventors: Hiroshi Itoh, Kanagawa-Ken (JP); Ryohta Kawase, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 10/376,421

(22) Filed: Feb. 25, 2003

(65) Prior Publication Data

US 2004/0039890 A1  Feb. 26, 2004

(30) Foreign Application Priority Data

Feb. 25, 2002 (JP) .............................. 2002-047838

(51) Int. Cl.
  *G06F 12/02* (2006.01)
(52) U.S. Cl. ................ 711/162; 707/204; 711/112; 711/156
(58) Field of Classification Search ........ 711/161–162, 711/112, 156; 707/204
  See application file for complete search history.

(56) References Cited

U.S. PATENT DOCUMENTS

| | | | | |
|---|---|---|---|---|
| 4,872,106 A | * | 10/1989 | Slater ........................... | 714/13 |
| 4,879,687 A | * | 11/1989 | Okamoto et al. ........... | 365/200 |
| 6,353,878 B1 | * | 3/2002 | Dunham ..................... | 711/162 |
| 6,546,472 B1 | * | 4/2003 | Atkinson et al. ........... | 711/156 |
| 6,665,779 B1 | * | 12/2003 | Polfer et al. ................. | 711/162 |
| 6,898,669 B1 | * | 5/2005 | Tomita ........................ | 711/114 |
| 2003/0004947 A1 | * | 1/2003 | Coverston ..................... | 707/9 |
| 2003/0115414 A1 | * | 6/2003 | Tomita ........................ | 711/114 |
| 2005/0131965 A1 | * | 6/2005 | Lam et al. .................. | 707/204 |
| 2005/0216788 A1 | * | 9/2005 | Mani-Meitav et al. ......... | 714/6 |

FOREIGN PATENT DOCUMENTS

| | | |
|---|---|---|
| JP | 63-296128 | 2/1988 |
| JP | 61272718 | 5/1988 |
| JP | 02-093721 | 4/1990 |
| JP | 01013577 | 8/1990 |
| JP | 10-064170 | 6/1998 |
| JP | 11029763 | 5/2000 |

* cited by examiner

*Primary Examiner*—Stephen C. Elmore
*Assistant Examiner*—Hetul Patel
(74) *Attorney, Agent, or Firm*—Paik Saber; Bryan W. Butler; Dillon & Yudell LLP

(57) ABSTRACT

Recording devices are disclosed having data storage units using disk-shaped storage media, data allocation storage units for storing allocation information of each stored data, and control units for writing and reading data using the allocation information in the data allocation storage, and also have use status storage units for storing use status information indicating each storage area in the data storage units is a valid area having data written therein or an invalid area having no data written therein. If the control units receive a read request for the data stored in the data storage units, the control units select only data of valid areas using the use status information in the use status storage units and read out the data.

18 Claims, 14 Drawing Sheets

| | SC0 | SC1 | SC2 | SC3 | SC4 | SC5 | SC6 |
|---|---|---|---|---|---|---|---|
| TR0 | 1 | 1 | 1 | 1 | 1 | 1 | 1 |
| TR1 | SC7 1 | SC8 1 | SC9 1 | SC10 1 | SC11 1 | SC12 1 | SC13 1 |
| TR2 | SC14 1 | SC15 1 | SC16 1 | SC17 1 | SC18 1 | SC19 1 | SC20 1 |
| TR3 | SC21 1 | SC22 1 | SC23 1 | SC24 1 | SC25 1 | SC26 1 | SC27 1 |
| TR4 | SC28 1 | SC29 1 | SC30 1 | SC31 1 | SC32 1 | SC33 1 | SC34 1 |
| TR5 | SC35 1 | SC36 1 | SC37 1 | SC38 1 | SC39 1 | SC40 1 | SC41 1 |
| TR6 | SC42 1 | SC43 1 | SC44 1 | SC45 1 | SC46 1 | SC47 1 | SC48 1 |
| TR7 | SC49 1 | SC50 1 | SC53 1 | SC52 1 | SC53 0 | SC54 0 | SC55 0 |

⇒

| | SC0 | SC1 | SC2 | SC3 | SC4 | SC5 | SC6 |
|---|---|---|---|---|---|---|---|
| TR0 | 1 | 1 | 1 | 1 | 1 | 1 | 1 |
| TR1 | SC7 1 | SC8 1 | SC9 1 | SC10 1 | SC11 1 | SC12 1 | SC13 1 |
| TR2 | SC14 1 | SC15 1 | SC16 1 | SC17 1 | SC18 1 | SC19 0 | SC20 0 |
| TR3 | SC21 0 | SC22 0 | SC23 0 | SC24 0 | SC25 1 | SC26 1 | SC27 1 |
| TR4 | SC28 1 | SC29 1 | SC30 1 | SC31 1 | SC32 1 | SC33 1 | SC34 1 |
| TR5 | SC35 1 | SC36 1 | SC37 1 | SC38 1 | SC39 1 | SC40 1 | SC41 1 |
| TR6 | SC42 1 | SC43 0 | SC44 0 | SC45 0 | SC46 0 | SC47 0 | SC48 1 |
| TR7 | SC49 1 | SC50 1 | SC53 1 | SC52 1 | SC53 0 | SC54 0 | SC55 0 |

RECORDING DEVICE AND RECORDING SYSTEM USING RECORDING DISK, AND BACKUP, METHOD FOR THE SAME

PRIORITY CLAIM

This application claims the benefit of priority of Japanese Patent Application Number 2002-3096368 filed Feb. 25, 2002.

BACKGROUND

1. Technical Field

Embodiments of the present invention relate to a recording device and a recording system for recording various data using a recording disk, such as a magnetic disk or an optical disk, and transferring the recorded data to another recording device to enable backup, and particularly to a technique for high-speed backup of data.

2. Description of the Related Art

Recording devices and recording systems for recording various data using recording disks, such as magnetic disks or optical disks, are broadly used. As recording devices which enable backup of data to another recording device, for example, many relatively large-scale recording devices are employed for business use which enable backup to another recording device through a leased or public telecommunication line. As for personal computers, it is known that data on an integrated hard disk device can be backed up to another integrated hard disk device through an internal signal line or can be backed up to an external hard disk device through a connection cable. The purpose of backup is, for example, to prevent loss of data due to failures in the recording devices, natural disasters such as earthquakes, or other accidents. To simplify the explanation, all of the above-described telecommunication lines, signal lines and connection cables will be referred to as a signal line in the following description.

FIG. 12 is a block diagram showing the schematic structure of conventional recording devices and a recording system which enable backup.

In FIG. 12, reference numerals 1 and 2 each represent a recording device using a recording disk. Reference numeral 3 represents an administration device for administering the recording devices 1 and 2, including the backup of data. Reference numeral 5 represents a signal line directly connecting the recording devices 1 and 2. Reference numeral 6 represents a signal line connecting the recording device 1 with the administration device 3. Reference numeral 7 represents a signal line connecting the recording device 2 with the administration device 3. The recording devices 1 and 2 are indirectly connected with each other by the signal lines 6 and 7 through the administration device 3. A typical recording system may have one of the paths of the signal line 5 and the signal lines 6 and 7, or may have both of these paths.

The illustrated recording devices 1 and 2 have the same structure. In the recording device 1, a data storage unit 12 for storing various data using a recording disk, a data allocation storage unit 13 for storing data allocation indicating where and what data are recorded on the recording disk, and a control unit 11 for controlling transmission/reception of data to/from outside through the signal line 5 or 6, writing of data received from outside, recording of written data allocation information to data allocation storage unit 13 and reading of data from the recording disk on the basis of data allocation storage unit 13 are provided. Also, recording device 2 is provided with similar units, i.e., a data storage unit 22, a data allocation storage trait 23 and a control unit 21.

In the case of reading data from data storage unit 12 of recording device 1 and writing the data to data storage unit 22 of recording device 2 for backup, for example, data is sent directly from the recording device 1 to recording device 2 through the signal line 5, or data is sent indirectly from recording device 1 to recording device 2 through the signal line 6, administration device 3 and signal line 7. When the path of signal line 5 and the path using signal lines 6 and 7 are both provided, the burden of the operation for backup of data from recording device 1 to recording device 2 in the administration device 3 can be reduced by directly sending the data through signal line 5.

Generally, in a recording device using a recording disk, when erasing recorded data, only data allocation information, such as addresses of start and end storage areas of data stored in the data allocation storage unit, is erased, without erasing the actual data stored in the data storage unit. For example, in recording device 1, data written in data storage unit 12 is not erased and only data allocation information in data allocation storage unit 13 is erased. This is because when writing new data, a storage area having no data allocation information in data storage unit 12 may be overwritten with the new data, and it is not necessary to take time to erase data written in data storage unit 12.

FIG. 13 shows a simplified example of data storage unit 12 and data allocation storage unit 13 in the situation of erasing data in the recording device 1.

The left side of FIG. 13 shows data storage unit 12 and data allocation storage unit 13 before erasing data. The right side of FIG. 13 shows data storage unit 12 and data allocation storage unit 13 after erasing data.

Data storage unit 12 is a recording disk having, recording tracks TR0 to TR7. Each track is divided into seven sectors, which are smallest recording units (storage areas). Therefore, there are fifty six sectors SC0 to SC55 for the eight recording tracks TR0 to TR7.

In data allocation storage unit 13, allocation information of seven data D1 to D7 is recorded. For example, data D1 is recorded in sectors SC0 to SC5 of track TR0, and data D5 is recorded in discontinuous storage areas in the recording disk, i.e., sector SC19 of track TR2 to sector SC24 of track TR3 and sectors SC43 to SC47 of track TR6.

In recording device 1 of FIG. 13, for example, when data D5 is erased from the left side of FIG. 13, which shows the state-before erasing data, only allocation information of data D5 is erased from data allocation storage unit 13 and data storage unit 12 remains unchanged, as seen from the right side of FIG. 13, which shows the state after erasing data. On the right side of FIG. 13, which shows the state after erasing data, the data recorded in sector SC19 of track TR2 to sector SC24 of track TR3 and sectors S43 to SC47 of track TR6 remains as it is.

In the case of backing up, to recording device 2 of FIG. 12, the data in recording device 1 in the state after erasing data shown on the right side of FIG. 13, the contents of data D5 recorded in sector SC19 of track TR2 to sector SC24 of track TR3 and sectors SC43 to SC47 of track TR6 in data storage unit 12 are read out from recording device 1 and written to recording device 2 as they are, though the data need not be backed up.

FIG. 14 shows the states of data allocation storage units and data storage units on both the reading side and the writing side in the case of carrying out backup between the conventional recording devices.

The left side of FIG. 14 shows data storage unit 12 and data allocation storage unit 13 of recording device 1 as the data reading side. The right side of FIG. 14 shows data storage unit 22 and data allocation storage unit 23 of recording device 2 as the data writing side.

In FIG. 14, since allocation information of data D5 is erased in data allocation storage units 13 and 23, sector SC19 of track TR2 to sector SC24 of track TR3 and sectors SC43 to SC 47 of track TR6, where data D5 is stored, in data storage unit 12 on the reading side shown on the left side of FIG. 14, are not used and have invalid data. In short, the data in sectors SC19 to SC24 and sectors SC43 to SC47 in data storage unit 12 is not erased and remains as data even if its allocation information is erased, which is data of invalid areas.

In data storage unit 22 on the writing side shown on the right side of FIG. 14, since all the data in data storage unit 12 is written as it is, the data in sectors SC19 to SC24 and sectors SC43 to SC47, which are invalid areas, is also written.

However, recording devices with larger capacity as desired because of the spread of multimedia and networking in recent years and, therefore, recording disks have had larger capacity. In this situation, for example, the quantity of invalid data, such as erased data in a recording disk used for a long time, may be increased to a level that is not negligible. Therefore, at the time of backup, the time required for reading and writing the erased data is increased and a very long time is necessary for backup. Since, during backup, the capability of the recording device may be limited or the recording device may not be used, the increase in backup time raises a problem.

BRIEF SUMMARY

In order to solve the problem as described above, a recording device and recording system using recording disk, and backup method for the same, are provided which reduce reading and writing of invalid data, such as erased data, at the time of backup and thus diminishes backup time.

According to one embodiment, a recording device is provided which uses a recording disk and includes at least a data storage unit for writing and reading data using a disk-shaped storage medium having a plurality of recording tracks each of which has a plurality of storage areas provided therein, a data allocation storage unit for storing at least allocation information of first and last storage areas of each data written in the data storage unit, a control unit for performing writing into a storage area which is not recorded in the allocation information using the allocation information in the data allocation storage unit and storing allocation information of written data in the data allocation storage unit when the data are to be written, or reading out data to a signal line using the allocation information in the data allocation storage unit when the data are to be read, and is characterized in that it is provided with a use status storage unit for storing use status information indicating, for each storage area in the data storage unit, whether the area is a valid area with the allocation information indicating the existence of data, or an invalid area with the allocation information not indicating the existence of data and the control unit performs reading from the valid area based on the use status information when it receives a read request for data stored in the data storage unit.

Additionally, in another embodiment the use status storage unit stores use status information of each storage area in the form of a table in the order of arrangement of the recording tracks in the data storage unit and in the order of arrangement of the storage areas.

In yet another embodiment a backup method for a recording device using a recording disk is provided comprising backing up data from one recording device on a reading side to another recording device, wherein a recording device having a disk-shaped storage medium (recording disk) having a plurality of storage areas provided therein, writing or reading data using at least allocation information of first and last storage areas of each data written in the storage medium, and storing use status information indicating whether each storage area is a valid area with the allocation information indicating the existence of data or an invalid area with the allocation information not indicating the existence of data, is used as at least the one recording device, and the method is characterized in that the one recording device on the reading side performs reading from the valid area using the use status information when it receives a request of reading the recording disk for a backup purpose.

BRIEF DESCRIPTION OF THE DRAWINGS

FIG. 6 shows an example of use status information stored in a use status storage unit.

FIG. 8 shows the states of use status storage units and data storage units on both the reading side and the writing side when performing backup between recording devices.

DETAILED DESCRIPTION

Figure 1:
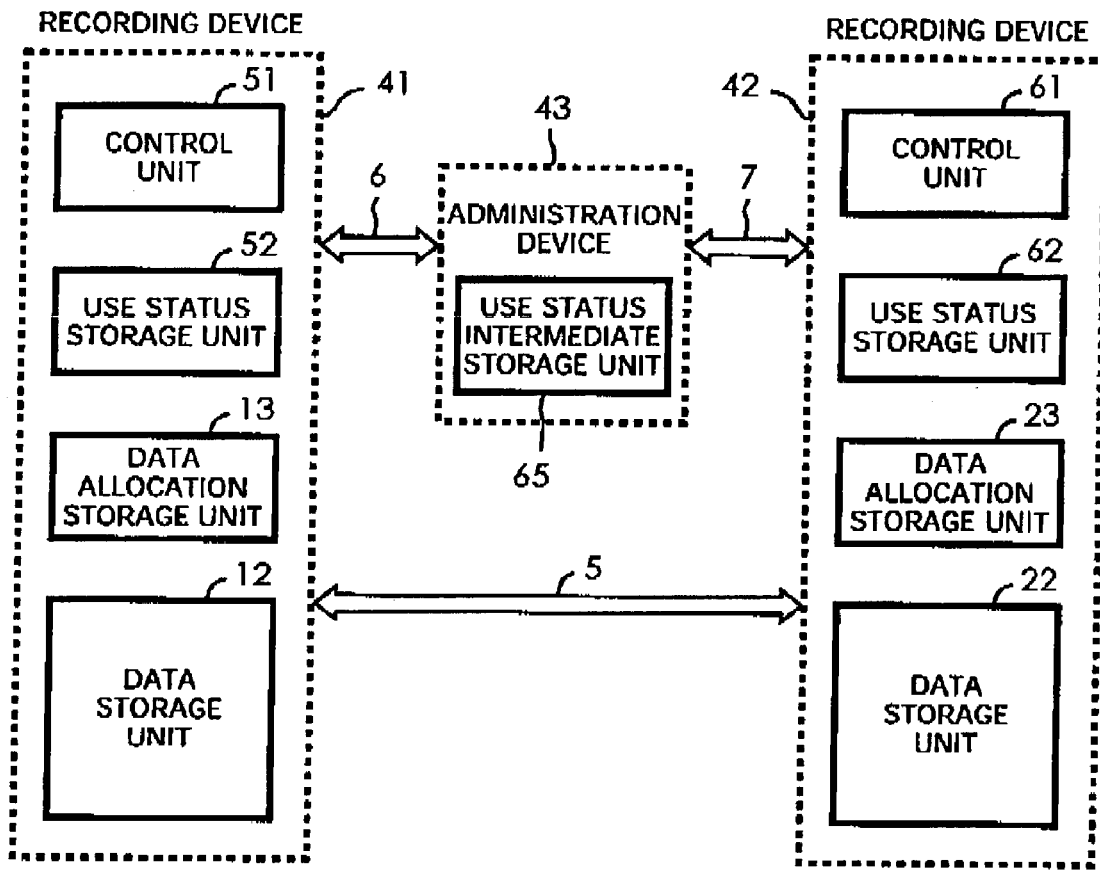
FIG. 1 is a block diagram showing the schematic structure of a recording device and a recording system of an embodiment of this invention capable of performing backup.

Embodiments of the present invention will next be described with reference to the drawings in which:

FIG. 1 is a block diagram showing the schematic structure of a recording device and a recording system according to one embodiment of this invention.

Figure 12:
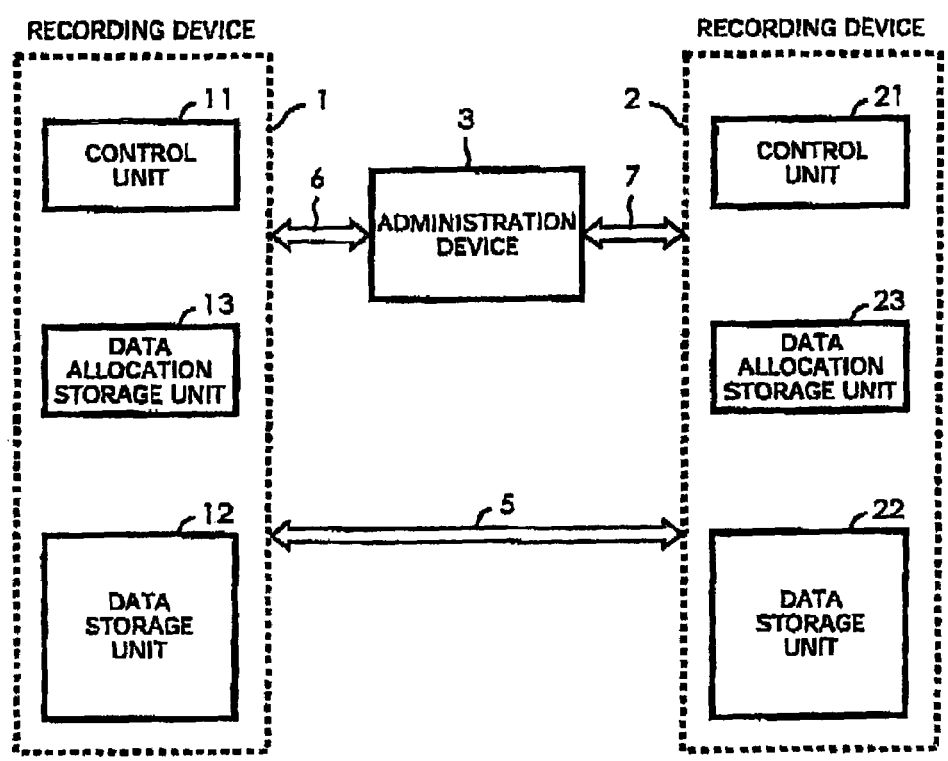
FIG. 12 is a block diagram showing the schematic structure of a conventional recording device and recording system capable of performing backup.

In FIG. 1, the units having the same functions as in the conventional recording device and recording system shown in FIG. 12 are denoted by the same numerals and will not be described farther in detail.

The recording device and the recording system of the embodiment shown in FIG. 1 differ from the conventional recording device and recording system shown in FIG. 12, mainly in the following features.

(1) Use status storage units 52, 62 for storing use status information separately indicating whether each storage area of data storage units 12, 22 of recording devices 41, 42 is a valid area with allocation information indicating the existence of data by data writing records, or an invalid area with allocation information not indicating the existence of data, are provided.

(2) When control units 51, 61 of the recording devices 41, 42 receive a read request for data stored in the data storage units 12, 22, the control units 51, 61 select and read only valid areas using the use status information in the use status storage units 52, 62 and do not read invalid areas.

(3) For example, in the case of performing backup of data in the recording device 41 to the recording device 42 through an administration device 43, the administration device 43 inquires of the recording device 41 on the data reading side whether processing to select and read only valid areas using the use status information is possible or not. If the processing to select and read only valid areas is possible, the administration device 43 requests for sending of the use status information stored in the use status storage unit 52 before reading data from the data storage unit 12 and sending the data, and the administration device 43 has a use status intermediate storage unit 65 for storing that use status information.

Other main features implemented both in the conventional recording device and recording system and in the recording device of this embodiment include the following:

(a) The recording devices 41, 42 have data allocation storage units 13, 23 for storing at least allocation information Of first and last storage areas of each stored data in order to show a storage area or areas in the data storage units 12, 22 in which each of the stored data is written.

(b) When writing data, the control units 81, 61 use the allocation information stored in the data allocation storage units 13, 23 to write data in invalid areas in the data storage units 12, 22 with the allocation information not indicating the existence of data by data writing records. After the writing, the control units 81, 61 store allocation information including at least the addresses of the first and last storage areas in the data storage units 12, 22, of the written data, in the data allocation storage units 13, 23. When normally reading data, the control units 81, 61 use the allocation information in the data allocation storage units 13, 23 to read data from valid areas in the data storage units 12, 22 having the data writing records in the allocation information, and send the data through the signal line.

The whole backup processing at the time of backup may be mainly controlled by a recording device to be backed up, a backing-up recording device, or the administration device interposed between the recording device to be backed up and the backing-up recording device. In this embodiment, it is assumed that when the administration device is used, the administration device mainly controls the whole backup processing. Also, when the administration device is not used and the backup processing is directly performed between the recording devices, the recording device to be backed up mainly controls the whole backup processing. As described above, however, the backing-up recording device may also control the whole backup processing, like the recording device to be backed up.

To explain the effectiveness of embodiments of the present invention in further detail, storage areas and data allocation in a hard disk device will be taken as an exemplary recording disk used.

Figure 2:
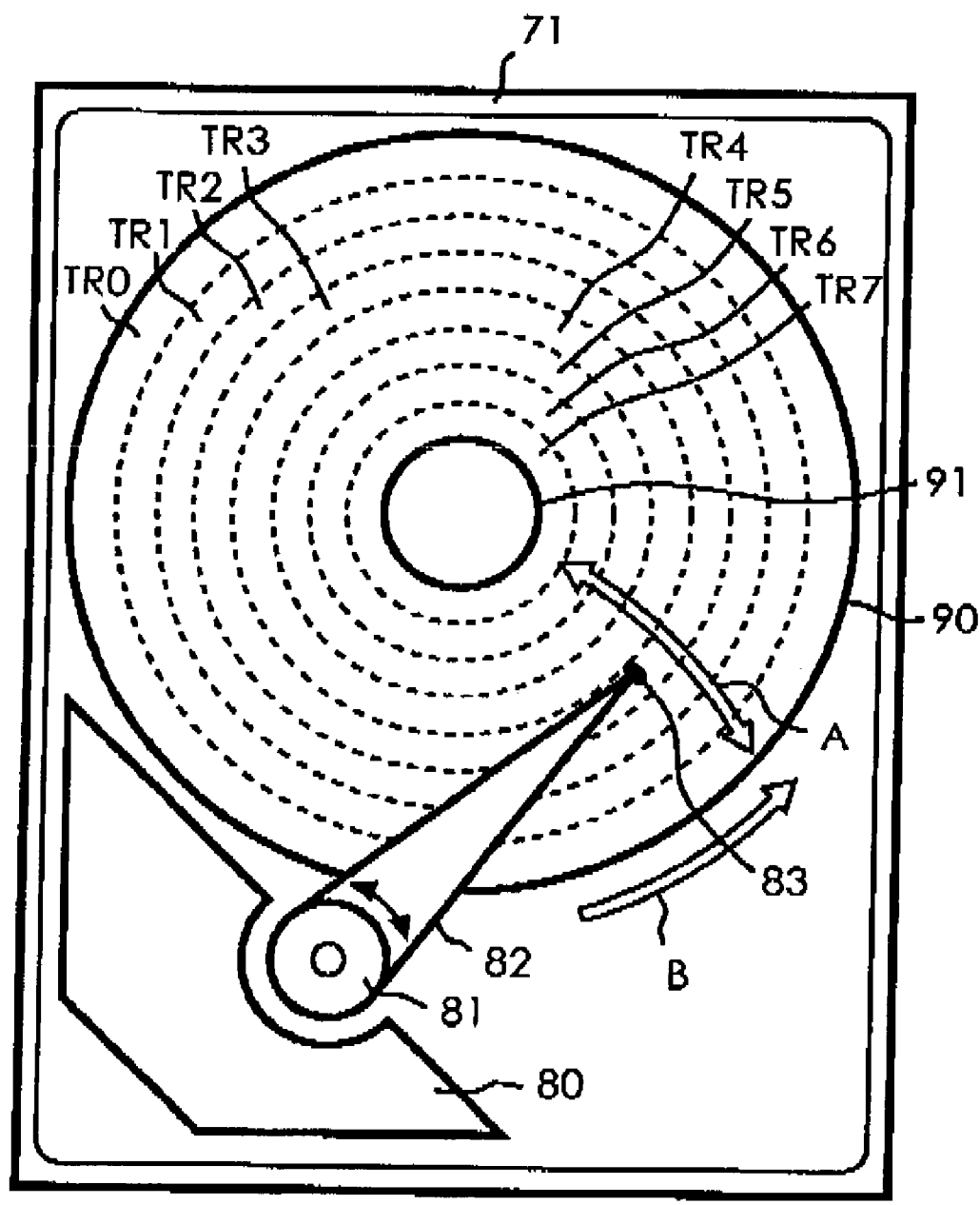
FIG. 2 shows the schematic structure of a disk and a head mechanism in a hard disk device.

FIG. 2 shows the schematic structure of a disk and a head mechanism in a hard disk device.

In a hard disk device 70 of FIG. 2, 71 represents a casing or enclosure for covering the outer circumference to protect inner components. 80 represents an actuator for driving an arm 82 (which will be described later) moving a magnetic head 83 (which will be described later). 81 represents a shaft for rotating the arm 82, and 82 represents an arm for holding and moving the magnetic head 83. 83 represents a magnetic recording/reproducing head (hereinafter referred to as magnetic head) for writing and reading recording information (data or the like) to and from a magnetic recording disk as a recording medium. As the actuator 80 drives the arm 82, the magnetic head 83 moves in a direction of an arrow A.

90 represents a magnetic recording disk (hereinafter referred to as disk) which is a recording medium rotating in a. direction of an arrow B and recording information thereon. 91 represents a spindle or shaft of the disk 90. On the disk 90 rotating in the direction of the arrow B, a plurality of recording tracks are concentrically provided which are referred to as tracks TR0, TR1, T2, TR3, . . . TR7 sequentially from the outer circumferential side to the inner circumferential side. The outermost track TR0 is an area used by an operating system (OS) for managing recorded information such as files. The next track TR1 is, for example, in the case of MS-DOS, an area used for a table (file allocation table or FAT) for associating recorded information such as files and directories with physical locations (e.g., sectors) within the disk. Track TR2 is, for example, in the case of MS-DOS, an area used for the directories showing, for each file, a file name, attribute, date and time of last update, file size, hierarchical structure and the like. Therefore, tracks TR0 to TR2 are used for management of recorded information. If the OS is, for example, UNIX®-based LINUX instead of MS-DOS, a file system called i-node system is used. Also in this case, some tracks are used for management.

Tracks TR3 to TR7 constitute a data area, where recorded information such as files is written. A storage area in one track is divided into smallest physical access units called sectors. Several sectors form one cluster (CL), and one or plural clusters (CL) form one file.

Generally, in both writing and reading information in the hard disk device, the most time-consuming operation is to move the magnetic head 83 in the direction of the arrow A to search for the position where target information is recorded, that is, so-called seek time. If increase in writing or reading speed in the hard disk device is intended, reduction in seek time is the most important task.

If all data is backed up between hard disk devices, for example, in order to reduce the seek time, a technique of sequentially reading data of the storage areas provided on the respective tracks, from the recording track TR0 on the outer circumferential side to the recording track TR7 on the inner circumferential side, irrespective of the recorded contents, is employed to reduce the moving time of the magnetic head 83.

Figure 3:
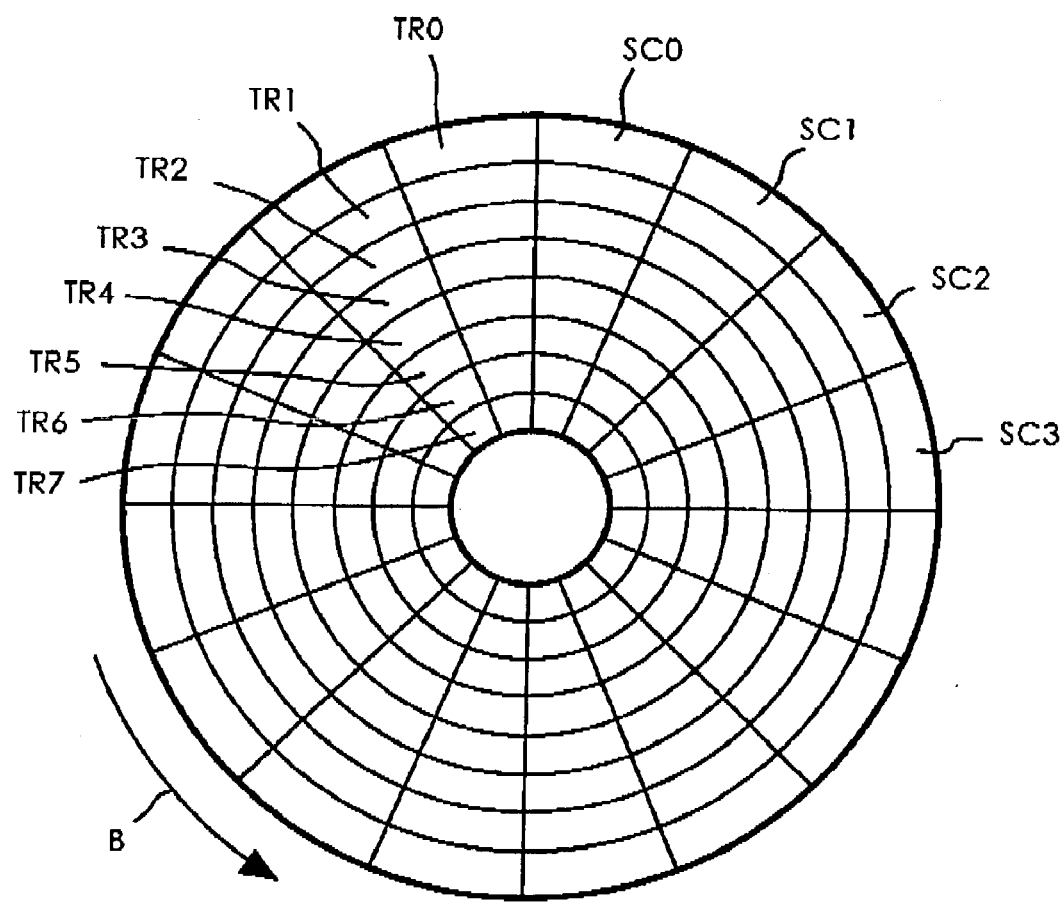
FIG. 3 shows the recording surface of a magnetic recoding disk of the hard disk device of FIG. 2.

FIG. 3 shows a recording surface of the magnetic recording disk 90 in the disk device 70 of FIG. 2.

As also shown in FIG. 2, a plurality of recording tracks TR0 to TR7 are concentrically provided sequentially from the outer circumferential side to the inner circumferential side on the disk 90 rotating in the direction of the arrow B. Sectors as smallest physical access units on the outermost track TR0 are sequentially referred to as sectors SC0, SC1, SC2, SC3, ... clockwise from the uppermost part in FIG. 3. Several sectors form one cluster (CL) and one or plural clusters (CL) form one file, though not particularly shown in FIG. 3.

Figure 4:
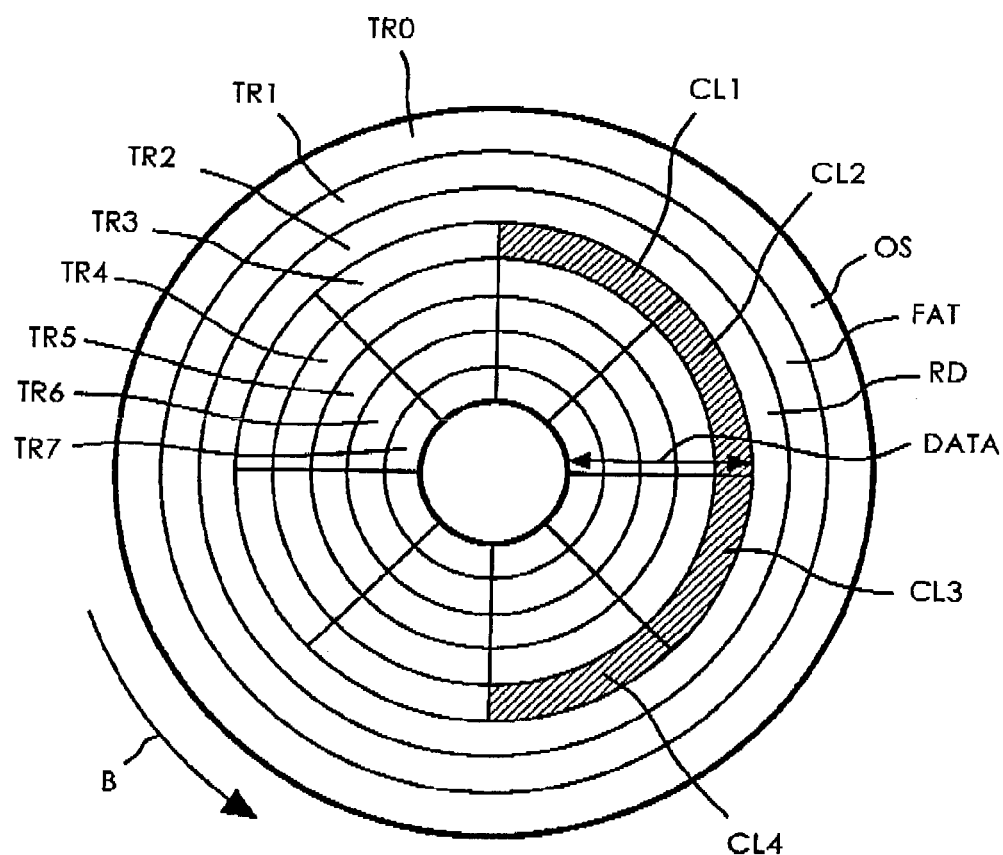
FIG. 4 shows an exemplary usage of the magnetic recording disk of the hard disk device of FIG. 2.

FIG. 4 shows an exemplary usage of the magnetic recording disk 90 in the hard disk device 70 of FIG. 2.

FIG. 4 shows the case where storage areas (clusters CL1 to CL4) on the disk 90 are continuously used. Generally, in the case of recording data on the disk 90, when the disk 90 is used for the first time, data is recorded continuously in storage areas on one recording track as shown in FIG. 4. As the use of the disk 90 is continued, free storage areas become scattered so that information is discontinuously recorded (written).

Figure 13:
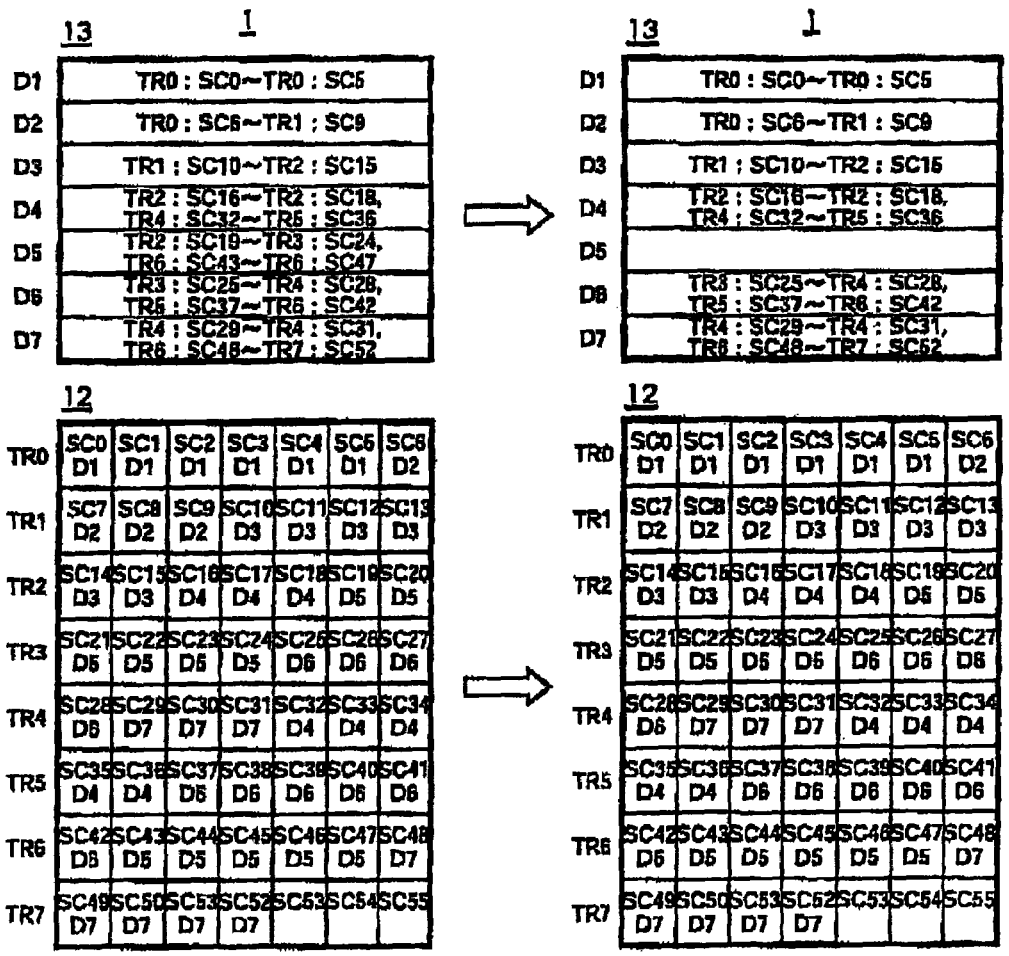
FIG. 13 shows a simplified example of a data storage unit and a data allocation storage unit when erasing data in the recording device.
Figure 14:
FIG. 14 shows the states of use status storage units and data storage units on both the reading side and the writing side when performing backup between the conventional recording devices.

While, in FIG. 4 and in FIG. 5 described later, the tracks are designated by TR0 to TR7, as a matter of convenience, in which track TR0 is used for OS, track TR1 is used for FAT, and track TR3 is used for directories, they do not correspond to tracks TR0 to TR7 shown in FIGS. 13 and 14. All the tracks shown in FIGS. 13 and 14 are ordinary data storage areas.

Figure 5:
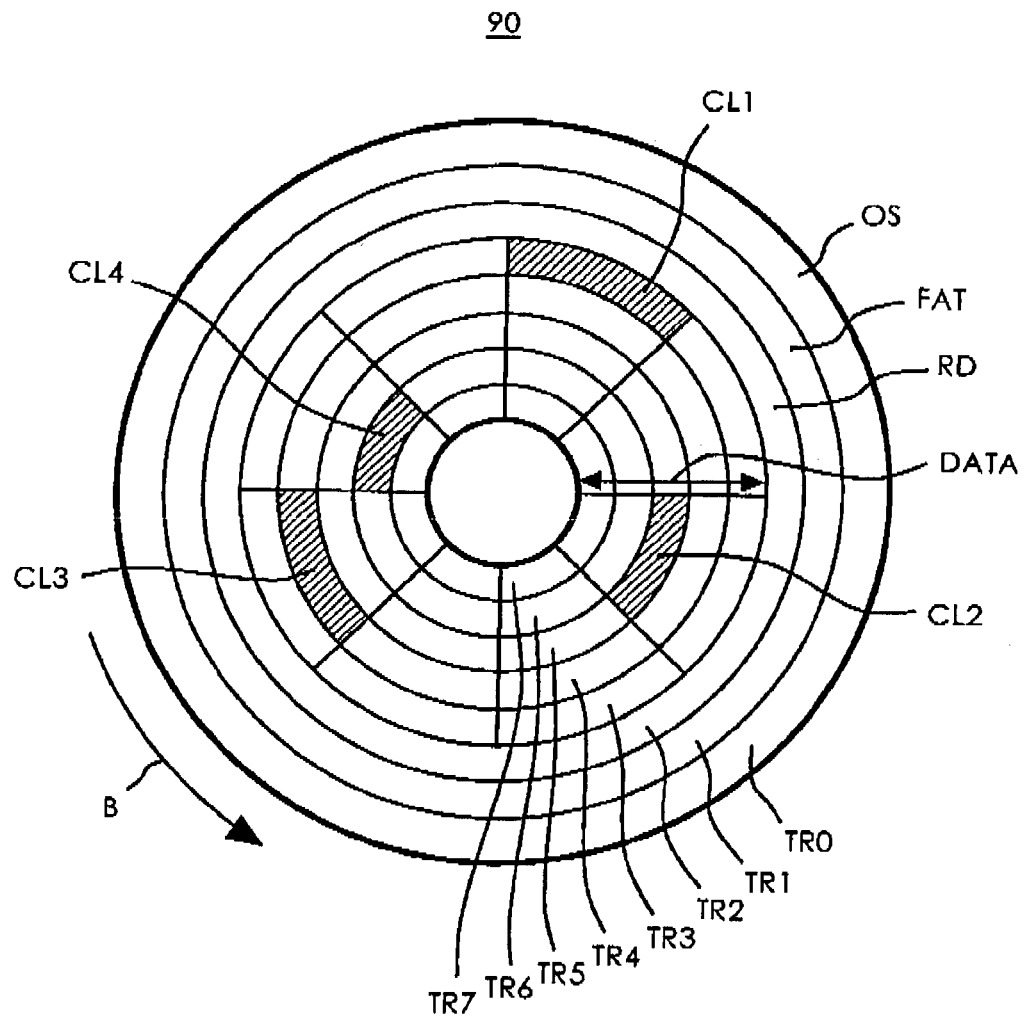
FIG. 5 shows an example of the case where the disk of FIG. 4 is discontinuous.

FIG. 5 shows an example of the case where recording on the disk 90 of FIG. 4 is discontinuous.

At the initial stage of use of the disk 90, for example, data can be continuously written in adjacent clusters on track TR3 as shown in FIG. 4. However, in FIG. 5, data is written in cluster CL1 on track TR3, cluster CL2 on track TRS, cluster CL3 on track TR4 and cluster CL4 on track TR6. When one file is discontinuously written in the clusters in the disk device 70 in this manner, a longer seek time for moving, the magnetic recording/reproducing head is necessary than when continuously writing data on the same track.

In the above-described case of performing backup of all data between the hard disk devices, if data of each storage area is sequentially, read from the recording track TR0 on the outer circumferential side to the recording track TR7 on the inner circumferential side, the magnetic head 83 only moves from one track to its adjacent track which requires minimum moving time. Therefore, the seek time can be reduced.

However, it does not suffice that, at the time of reading, the magnetic head 83 stays on a recording track for a time period for one turn of that track. For example, confirmation operations may be required in which data is read twice and the results of reading are checked at the control unit or, if the data is to be sent to the outside, the sent data is received again and checked. During the confirmation operation, the magnetic head 83 stays on the same recording track. Therefore, as more storage areas are used on the recording tracks, a longer reading time is required accordingly.

Writing processing is similar to the reading processing, in which as more storage areas are used for writing, a longer writing time is required accordingly. Moreover, since the writing processing is generally more time-consuming than the reading processing, a longer time is necessary for writing than reading for the same quantity of recording tracks to be used.

However, as shown in FIG. 13, when an unnecessary file is deleted, data written in tile data storage unit 12 remains as it is while allocation information of the data is erased. Since the allocation information in the data allocation storage unit 13 is not referred to at the time of backup, the contents of data D5 are backed up as they are though they are not necessary, as shown in FIG. 14.

As the disk 90 is used, it is more consumed and storage areas having unnecessary data to be deleted increase. Recently, the recording capacity of one hard disk device has been increased to tens of gigabytes or more so that the quantity of data transferred at the time of backup increases and, also, the quantity of data that has been deleted and need not be transferred increases.

In a large-scale recording device or recording system for business use, a backup operation transferring data stored on that day to another recording device may be carried out by an operator, taking tens of minutes or several hours after the normal business hours. Alternatively, if the backup operation can be carried out automatically by the recording device or the administration device alone without involving the operator, the data may be transferred in tens of minutes or several hours at night after the normal business hours, when the signal lines are less frequently used. In any case, as the quantity of data increases, the transfer time increases. As a result, the use time and communication time of the recording device and the administration device increase, thus increasing the time and cost necessary for the backup operation.

Therefore, for example, in the backup of data from the recording device 1 to the recording device 2 shown in FIG. 14, if the backup can be performed without transferring data D5 in the data storage unit 12, and if it is applied to the backup of data between large-capacity recording devices, the time and cost can be significantly reduced.

In view of the above, the present embodiment implements the use status storage units 52, 62 storing information of use status (valid area/invalid area) for each storage area of the data storage units 12, 22 in the recording devices so as to enable discrimination of invalid storage areas in the data storage units 12, 22, as shown in FIG. 1.

FIG. 6 shows an example of use status information stored in the use status storage units 52, 62.

In FIG. 6, the horizontal rows represent tracks and the vertical columns-ns correspond to sectors as smallest storage areas. However, if the processing unit is a larger unit, for example, cluster, the vertical columns may correspond to clusters in accordance with the processing unit. In the case of the data storage units 12, 22, a capacity of hundreds of bytes (e.g., 512 bytes) is necessary for each sector while, in the case of the use status storage units 52, 62, at least one bit suffices for each sector to indicate whether the sector is valid or invalid. Therefore, the increase in storage capacity for the use status information is small if its ratio to the whole capacity is considered. For example, if one bit per sector is necessary, 1 G (1000000K) bits/512/8=263K bits may suffice for each 1G-bit volume. Thus, the use status information bits can be sufficiently stored in a non-volatile semiconductor storage device such as a flash memory, a specific storage area on a hard disk, which cannot be accessed by the OS file system of the host system, or the like.

The left side of FIG. 6 shows an example of the use status storage unit 52 in the recording device 1 before data D5 is erased, as shown on the left side of FIG. 13. The right side shows an example of the use status storage unit 52 in the recording device 1 after data D5 is erased, as shown on the right side of FIG. 13.

On the left side of FIG. 6, all the sectors except the last three sectors SC53 to SC55 of track TR7 have a value "1", indicating that these sectors are in use or are valid sectors. On the other hand, on the right side of FIG. 6, not only sectors SC53 to SC55 but also sectors SC19 and SC20 of track TR2, sectors SC21 to SC24 of track TR3 and sectors SC43 to SC47 of track TR6 have a value "0". It can be seen that these sectors are not in use or are invalid sectors.

The information in the use status storage unit 52 is arranged in the form of a table in the order of arrangement of the recording tracks in the data storage unit 12 and in the order of arrangement of the sectors which are storage areas in each track. Therefore, the use stares information can be read out from the use status storage unit 52 in the order of arrangement of the storage areas for each track.

Thus, by using the use stares information in the use status storage unit 52 on the right side of FIG. 6 at the time of backup, the recording device 41 can avoid reading out unused data (of invalid areas) in the data storage unit 12.

In the case where the recording device 42 of the backup destination has the use status storage unit 62 as shown in FIG. 1, if the recording device 41 transfers the use status information in the use status storage unit 52 before starting actual backup of data, the recording device 42 can avoid writing unused data (of invalid areas) in the data storage unit 22.

When carrying out the backup operation using the above-described use status information between the recording device 41 and the recording device 42, it is considered that the control unit 51 and the control unit 61 require request control signals for performing new processing in addition to those (instruction signals) for performing ordinary processing.

Figure 7:
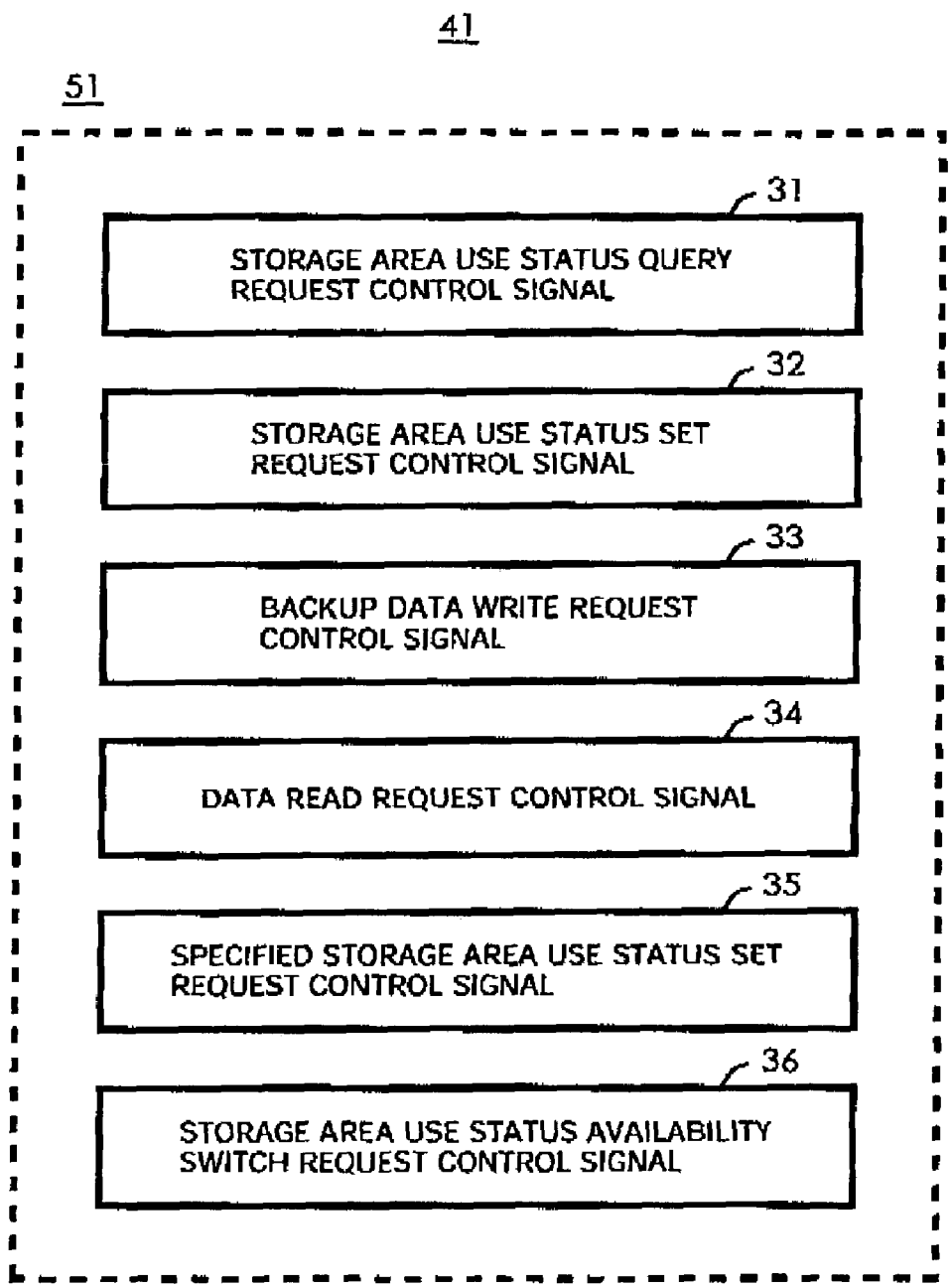
FIG. 7 shows request control signals considered to be necessary in a control unit.

FIG. 7 shows request control signals considered to be necessary in the control unit 51.

A storage area use status query request control signal 31 is the one, for example, for a writing destination at the time of backup to judge whether a reading source can select and read only valid areas using the use status information.

For example, in the backup of data from the recording device 41 to the recording device 42 in FIG. 1, the storage area use status query request control signal 31 is used in the case where the recording device 42 on the backup data receiving or writing side uses the use status information of this embodiment and wants to first inquire whether a recording device on the backup data reading side (sending source) usage the use status information or not.

In short, with the storage area use status query request control signal 31, an inquiry (request) in the form of a request control signal to request sending of the use status information to the recording device 41 of the reading source from the control unit 61 is sent, and if a response accepting the request is received, it can be judged that the recording device of the reading source also uses the use status information. However, if the request is not accepted, an error response is normally received and it is judged that the recording device of the reading source does not use the use status information.

If the recording device of the backup data reading source uses the use status information of this embodiment, the recording device 42 first acquires the use status information and writes only data of valid areas in the data storage unit 22. Otherwise, the recording device 42 writes data in all the storage areas.

A storage area use status set request control signal 32 is the one, for example, for the reading source at the time of backup to judge whether the writing destination can select and write only data of valid areas using the use status information.

For example, in the backup of data from the recording device 41 to the recording device 42 in FIG. 1, the storage area use status set request control signal 32 is used in the case where the recording device 41 on the backup data sending or reading side uses the use status information of this embodiment and wants to first inquire whether the recording device on the backup data writing side (receiving destination) uses the use status information or not.

In short, with the storage area use status set request control signal 32, a request in the form of a request control signal to request setting and storing of the use status information to the recording device 42 of the writing destination from the control unit 51 is sent, and if a response accepting the request is received, it can be judged that the recording device of the writing destination uses the use status information. However, if the request is not accepted, an error response is normally received and it is judged that the recording device of the writing destination does not use the use status information.

If the recording device of the backup data writing destination uses the use status information of this embodiment, the recording device 41 can first send the use status information, and read out and send only data of valid areas from the data storage unit 12. If the recording device of the writing destination does not use the use status information, the recording device 41 embeds zero-filled data into invalid areas read out from the data storage unit 12 and sends it out. However, the recording device 41 need not read out data of all the storage areas.

A backup data write request control signal 33 is the one, for example, for selecting and writing data in the case where the recording device 42 of the writing destination at the time of backup can judge that the reading source can select and read out only data of valid areas using the use status information, by receiving the storage area use status set request control signal 32 from the reading source. If the reading source cannot select only data of valid areas, data is written in accordance with an ordinary write request control signal.

A data read request control signal 34 is the one for ordinary data reading. For example, the data read request control signal 34 is used together with a storage area use status availability switch request control signal 36, which will be described later, to read and send selected data in the case where the recording device 41 of the reading source at the time of backup can judge that the writing destination can select and write only data of valid areas using the use status information, by receiving the storage area use status query request control signal 31 from the writing destination. If the writing destination cannot select only data of valid areas, this data read request control signal 34 carries out ordinary reading without selecting data.

A specified storage area use status set request control signal 35 is the one for setting "1" indicating that the storage area is in use (valid area) or "0" indicating that the storage area is unused (invalid area), for each storage area (sector) within the use status storage unit 52. Changing the values for sectors SC19 to SC24 and sectors SC43 to SC47 in the case of erasing data D5 in FIG. 6, from "1" on the left side of FIG; 6 to "0" on the right side of FIG. 6, is carried out by this request control signal.

A storage area use status availability switch request control signal 36 is the one, for example, for improving the efficiency of processing by not referring to the information of storage area use status stored in the use status storage unit 62 in the subsequent processing, in the case where the recording device 42 of the writing destination at the time of backup receives an error response instead of a normal response to the storage area use Status query request control signal 31, from the reading source, and thus learns that the partner (recording device 41) does not use the use status information.

Figure 8:
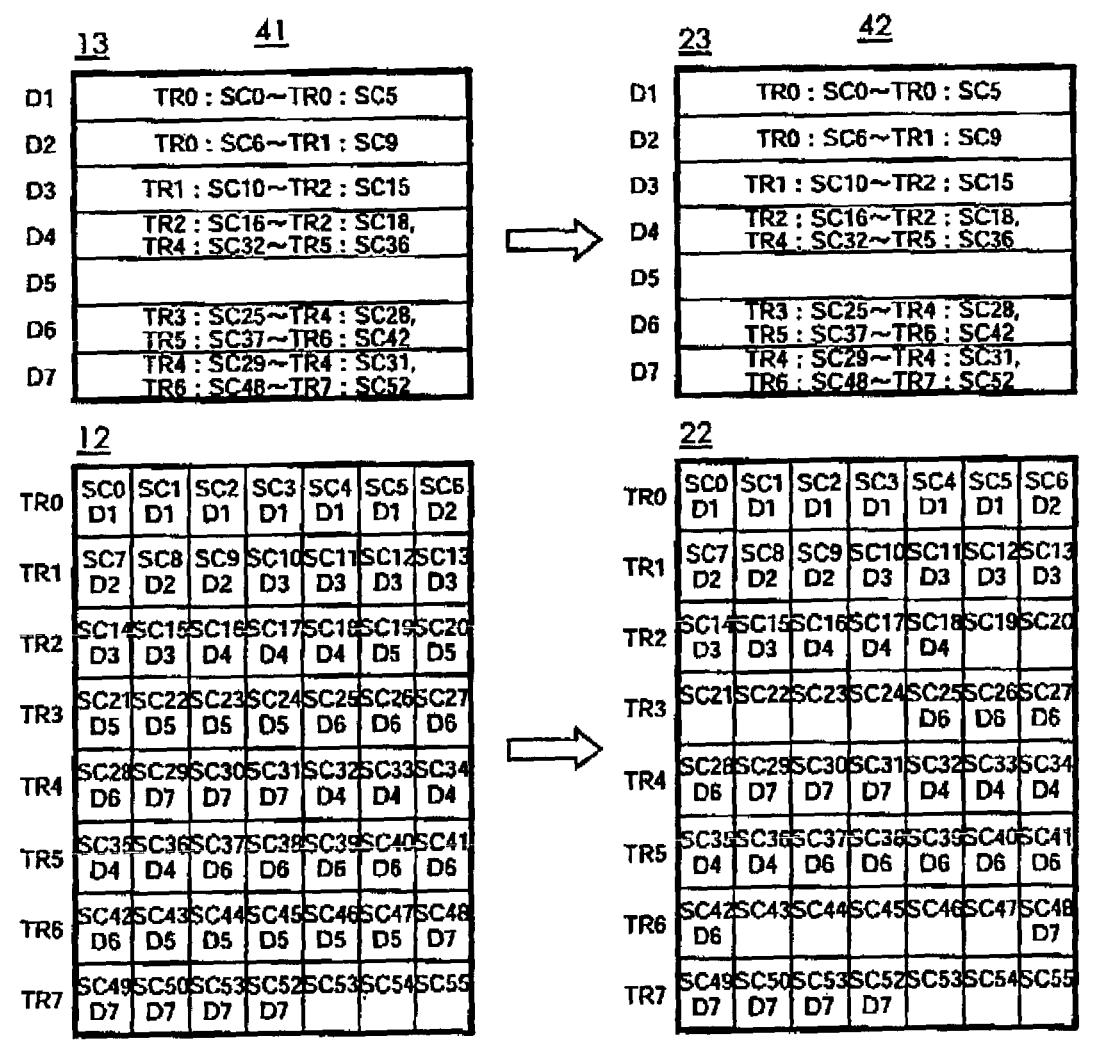

FIG. 8 shows use status storage units and data storage units on both the reading side and the writing side in the case of performing backup operations between the recording devices of this embodiment.

The left side of FIG. 8 shows the data reading side. Although this left side of FIG. 8 shows the states similar to those of the data storage unit 12 and the data allocation storage unit 13 of the conventional recording device 1 shown in FIG. 14, data D5 in sector SC19 of track TR2 to sector SC24 of track TR3 and sector SC43 to sector SC47 of track TR5 is not read out in the reading.

The right side of FIG. 8 shows the data writing side. Note that data D5 is not written in sector SC19 of track TR2 to sector SC24 of track TR3 and sector SC43 to sector SC47 of track TR6 in the data storage unit 22.

The operation of this embodiment will now be described with reference to flowcharts of FIGS. 9 to 11.

Figure 9:
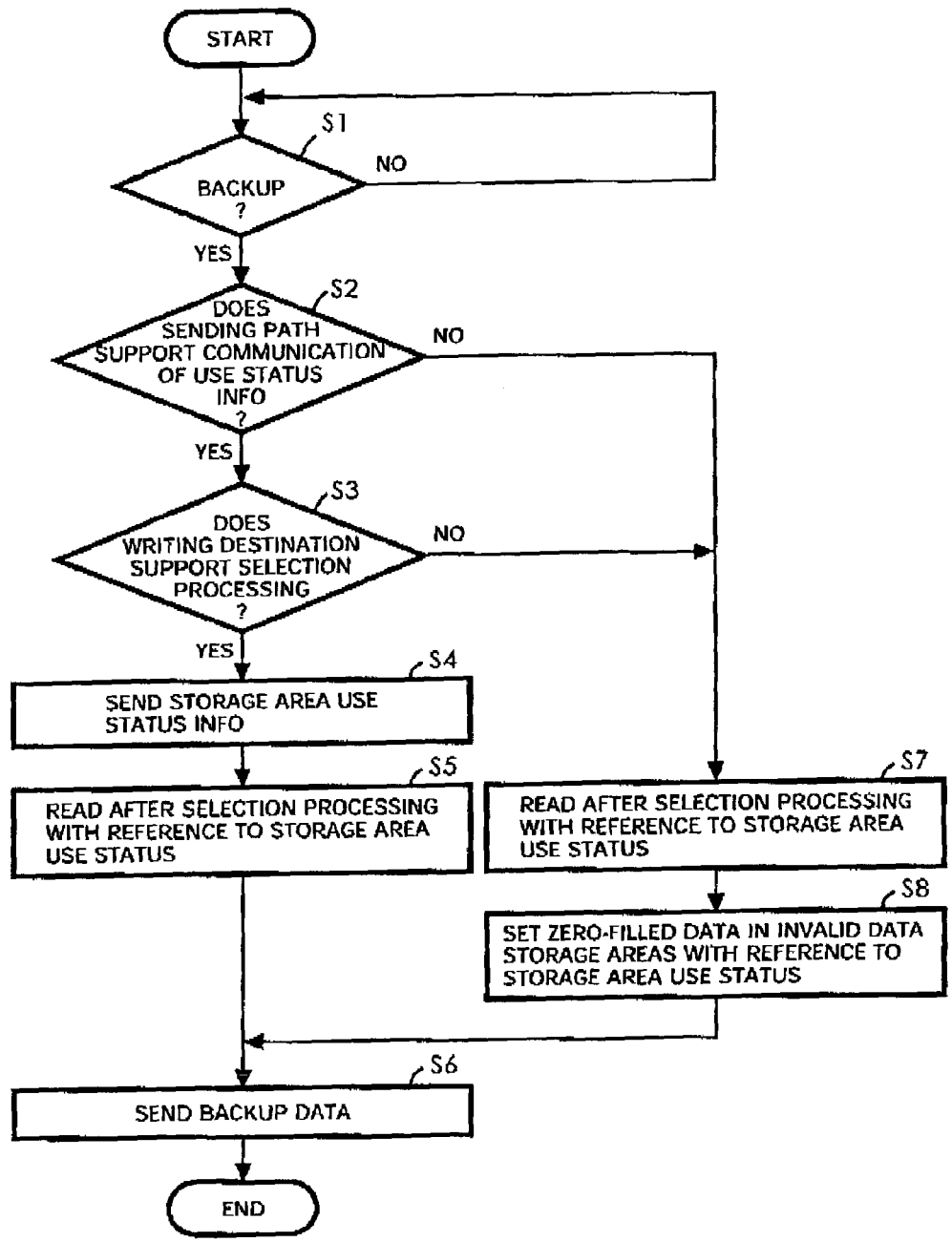
FIG. 9 is a flowchart showing the operation of the recording device on the reading side at the time of backup.

FIG. 9 is a flowchart showing the operation of the recording device on the reading side at the time of backup.

In the following description of FIGS. 9 to 11, a case of backing up data from the recording device 41 to the recording device 42 of FIG. 1 will be explained.

First, the recording device 41 judges whether backup is requested or not (S1) in accordance with the timer setting within the recording device 41, reception of a backup instruction request control signal from the outside, or reception of the storage area use status query request control signal 31 from the recording device 42 on the writing side. If backup is requested (YES at S1), the recording device 41 inquires whether the sending path supports communication of use stares information or not (S2), and judges whether the recording device of the writing destination can select and write only data of valid areas using the use stares information or not (S3). If backup is not requested (NO at S1), the recording device 41 returns to step S1 and repeats the processing to judge whether backup is requested or not.

The judgment at step S2 is necessary in the recording device 41 in the case of indirectly sending backup data, for example, through the administration device 43 and the signal lines 5 and 7 in FIG. 1. However, this processing is not necessary in the case of directly sending backup data through the signal line 5 in FIG. 1. The judgment at step S3 is necessary in the recording device 41 both in the case of indirectly sending backup data and in the case of directly sending backup data.

The judgment of whether the sending path supports communication of the use status information or not may be done by determining whether the recording device 41 has received the storage area use status query request control signal 31, or whether the recording device 41 has received a normal response instead of an error response after sending the storage area use status set request control signal 32 from the control unit 51 if the recording device 41 spontaneously performs backup. The judgment of whether the recording device of the writing destination can select and write only data of valid areas or not may share the above-described judgment on the sending path in the case of direct transmission. However, in the case of indirect transmission, for example, the recording device 41 waits for the result of judgment by the administration device 43 in FIG. 1. The result of judgment by the administration device 43 will be described later with reference to FIG. 11.

If the sending path does not support communication of the use status information (NO at S2), or if the recording device of the writing destination cannot select and write only data of valid areas (NO at S3), the recording device 41 executes the data read request control signal 34 at the control unit 51, performs selection processing at the control unit 51 with reference to the use status information read from the use Status storage unit 52, and then reads data from the data storage unit 12 (S7). Further, the recording device 41 sets zero-filled data as data in invalid areas (SS) using the information from the use status storage unit 52, and sends the backup data (S6). It should be noted that, at step S7, since the contents of the use status storage unit 52 are arranged in the Order for each track and for each storage area (sector), they can be. read out by moving the head similarly to the case of reading at the time of ordinary backup and therefore no excess seek time is necessary.

If the sending path supports communication of the use status information (YES at S2) and the recording device of the writing destination can select and write only data of valid areas (YES at S3), the recording device 41 reads the use status information (data) from the use status storage unit 52 and sends it to the recording device 42 (S4). If the storage area use status set request control signal 32 has not been sent from the control unit 51 of the recording device 41 up to this point, this request control signed will be sent in advance. The control unit 51 of the recording device 41 executes the data read request control, signal 34, selects only data of valid areas from the data storage unit 12 with reference to the information in the use status storage unit 52, and reads the data (S5). The backup data is then sent (S6).

Figure 10:
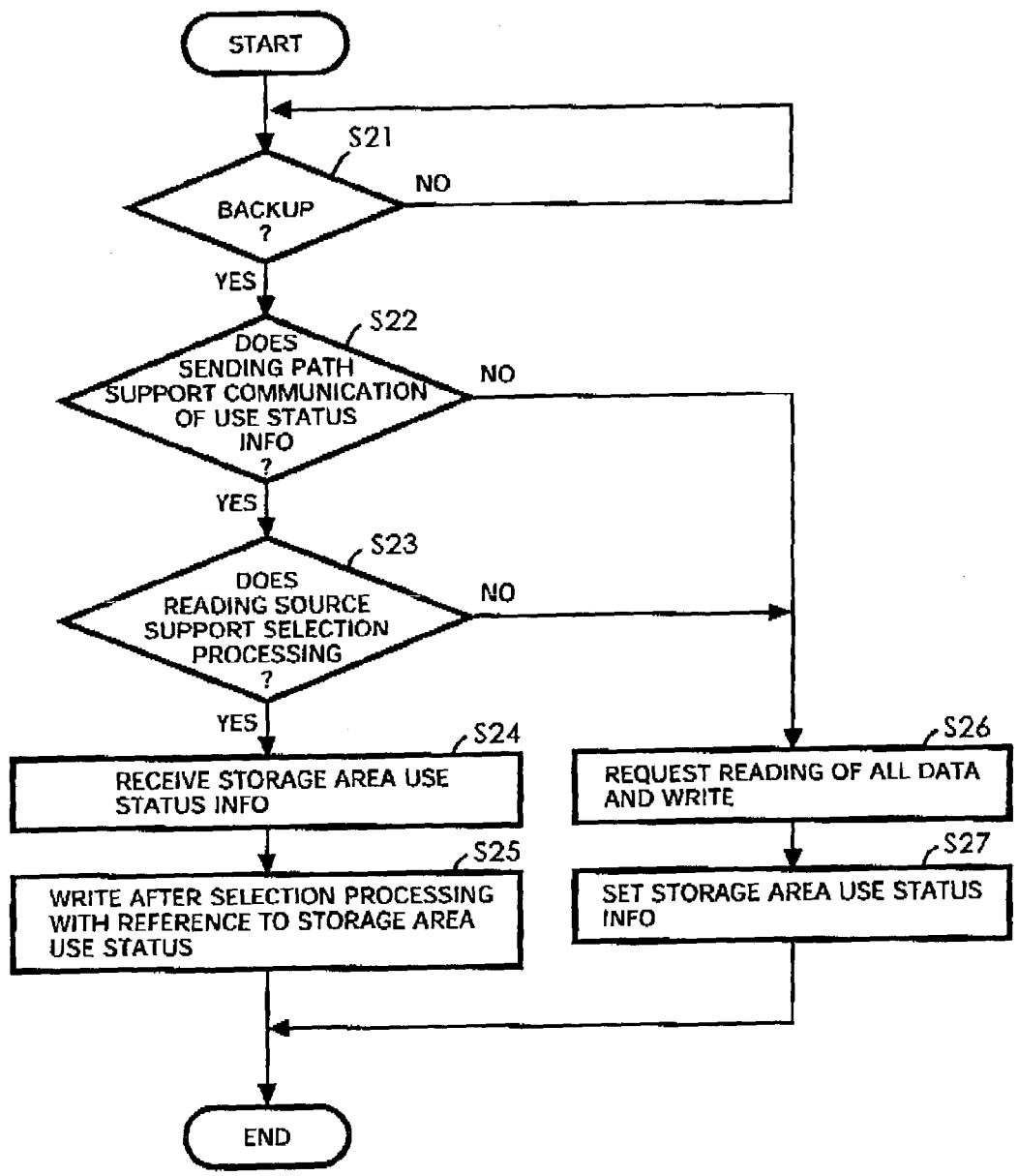
FIG. 10 is a flowchart showing the operation of the recording device on the writing side at the time of backup.

FIG. 10 is a flowchart showing the operation of the recording device on the writing side at the time of backup.

First, the recording device 42 judges whether backup is requested or not (S21) in accordance with the timer setting within the recording device 42, reception of a backup instruction request control signal from the outside, or reception of the storage area use status set request control signal 32 from the recording device 41 on the reading side. If backup is requested (YES at S21), the recording device 42 inquires whether the sending path supports communication of use status information or not (S22), and judges whether the recording device of the reading source can select and read only data of valid areas using the use status information or not (S23). If backup is not requested (NO at S21), the recording device 42 returns to step S21 and repeats the processing to judge whether backup is requested or not.

The judgment at step S22 is necessary in the recording device 42 in the case of indirectly sending backup data, for example; through the administration device 43 and the signal lines 6 and 7 in FIG. 1. However, this processing is not necessary in the case of directly sending backup data through the signal line S in FIG. 1. The judgment at step S23 is necessary in the recording device 42 both in the case of indirectly sending backup data and in the case of directly sending backup data.

The judgment of whether the sending path supports communication of the use status information or not may be done by determining whether the recording device 42 has received the storage area use status set request control signal 32, or whether the recording device 42 has received a normal response instead of an error response after sending the storage area use status query request control signal 31 from the control unit 61 in the case of spontaneously performing backup. The judgment of whether the recording device of the reading source can select and read only data of valid areas or not may share the above-described judgment on the sending path in the case of direct transmission. However, in the case of indirect transmission, for example, the recording device 42 waits for the result of judgment by the administration device 43 in FIG. 1. The result of judgment by the administration device 43 will be described later with reference to FIG. 11.

If the sending path does not support communication of the use status information (NO at S22), or if the recording device of the reading source cannot select and read only data of valid areas (NO at S23), first, an ordinary read request is sent from the control unit 61 of the recording device 42, and processing time is reduced by not referring to the Use status information in accordance with the storage area use status availability switch request control signal 36. Then, all the received data are written to the data storage unit 22 (S26).

If the sending path supports communication of the use status information (YES at S22) and the recording device of the reading source can select and read only data of valid areas (YES at S23), the recording device 42 writes the use status information received from the recording device 41 to the use status storage unit 62 (S24). If the storage area use status query request control signal 31 has not been sent from the control unit 61 of the recording device 42 up to this point, this request control signal will be sent in advance. The control unit 61 of the recording device 42 executes the backup data write request control signal 33, selects only data of valid areas from the data storage unit 22 with reference to the data of the use status storage unit 62, and writes the data to the data storage unit 22 (S25). It should be noted that, at step S25, since the contents of the use status storage unit 62 of the recording device 42 are arranged in the order for each track and for each storage area (sector), they can be written by moving the head similarly to the case of writing at the time of ordinary backup and therefore no excess seek time is necessary.

Then, the recording device 42 stores (sets) new use status information in the use status storage unit 62 indicating that the storage areas into which the data have been written are valid areas (S27). Thus, high-speed backup of this embodiment can be performed when the backup data is sent from the recording device 42 at the next time.

Figure 11:
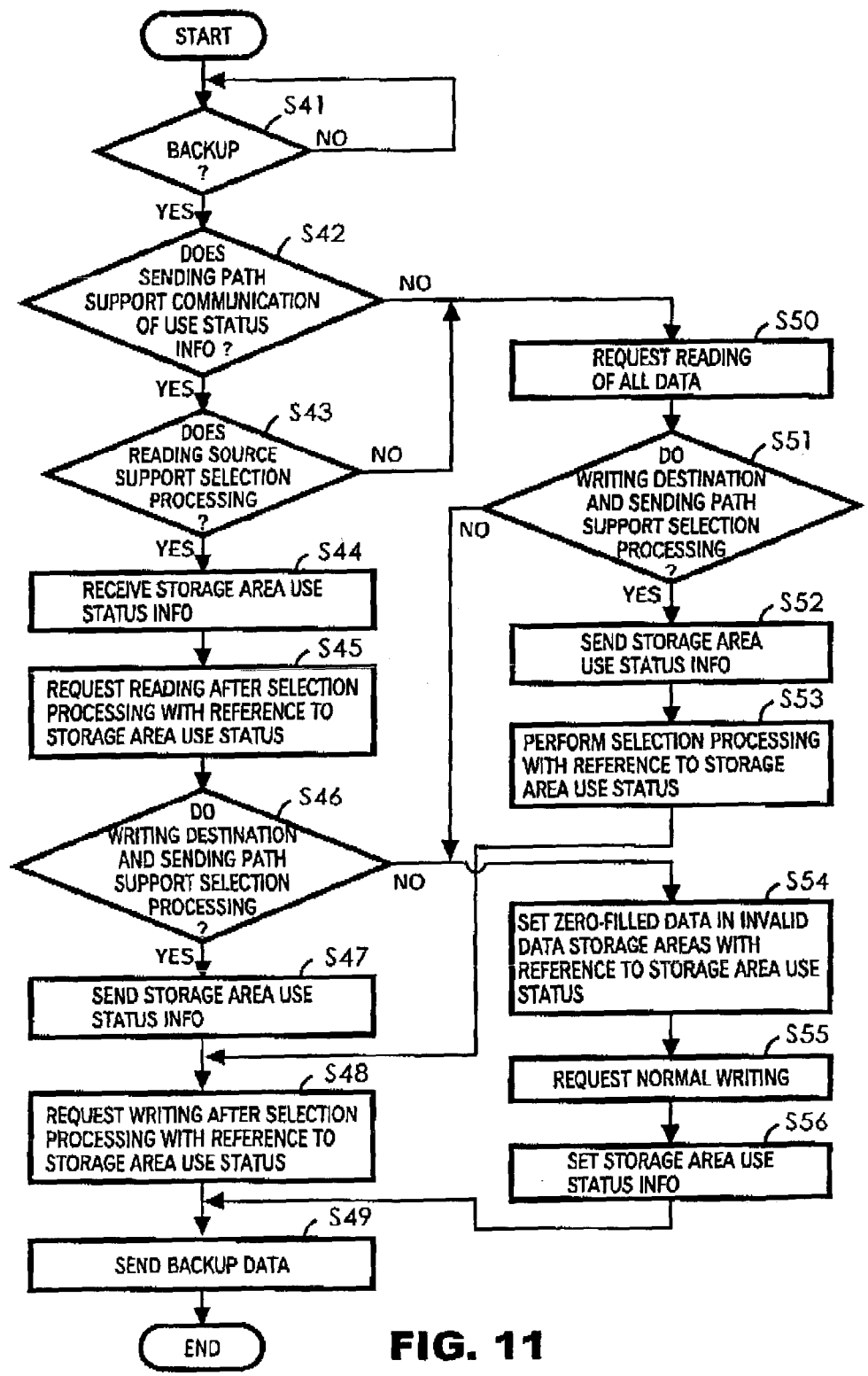
FIG. 11 is a flowchart showing the operation of an administration device existing on the path at the time of backup.

FIG. 11 is a flowchart showing the operation of the administration device provided on the path at the time of backup.

First, the administration device 43 judges whether backup is requested or not (S41) in accordance with the timer setting within the administration device 43, reception of a backup instruction request control signal from the outside, reception of the storage area use status query request control signal 31 from the recording device 42 on the writing side, or reception of the storage area use status set request control signal 32 from the recording device 41 on the reading side. If backup is requested (YES at S41), the administration device 43 inquires whether the sending path from the recording device 41 on the reading side supports communication of use status information or not (S42), and judges whether the recording device of the reading source can select and read only data of valid areas using the use status information or not (S43). If backup is not requested (NO at S41), the administration device 43 returns to step S1 and repeats the processing to judge whether backup, is requested or not.

The judgment at step 842 is necessary in the administration device 43, for example, if some relay device exists at a halfway part on the signal line 6 in FIG. 1 to indirectly send data through the relay device. However, this processing is not necessary in the administration device 43 in the case of directly, sending data through the signal line 6. The judgment at step 843 is necessary in the administration device 43 both in the case of indirectly sending data and in the case of directly sending data.

The judgment of whether the sending path from the recording device 41 on the reading side supports communication of the use status information or not may be done by determining whether the administration device 43 has received the storage area use status set request control signal 32, or whether the administration device 43 has received a normal response instead of an error response after sending the storage area use status query request control signal 31 to the recording device 41 on the reading side in the case of spontaneously performing backup. The judgment of whether the recording device of the reading source can select and read only data of valid areas or not may share the above-described judgment on the sending path in the case of direct transmission. However, in the case of indirect transmission, the administration device 43 waits for the result of judgment by the relay device existing on the path.

If the sending path from the recording device 41 on the reading side does not support communication of the use status information (NO at S42), or if the recording device of the reading source cannot select and read only data of valid areas (NO at S43), the administration device 43 sends an ordinary read request (all data read request) to the recording device 41 on the reading side The administration device 43 executes, for example, an ordinary data backup data write request control signal for all the data received from the recording device 41 on the reading side, and writes all the data to an intermediate data storage unit (not shown).

If the sending path from the recording device 41 on the reading side supports communication of the use status information (YES at S42) and the recording device of the reading source can select and read only data of valid areas (YES at S43), the administration device 43 writes the use status information received from the recording device 41 to the use status intermediate storage unit 65 (S44). If the storage area use status query request control signal 31 has not been sent from the administration device 43 to the recording device 41 on the reading side up to this point, the administration device 43-sends this request control signal in advance. The administration device 43 sends the data read request control signal 34 to the recording device 41 on the reading side and causes the recording device 41 to select data with reference to the storage area use status and read the data.

The administration device 43 executes, for example, the backup data write request control signal 33 with respect to the data received from the recording device 41 on the reading side, selects only data of valid areas with reference to the information in the use status intermediate storage unit 65, and writes the data to the intermediate data storage unit (not shown). Also in this case, since the contents of the use status intermediate storage unit 65 are arranged in the order for each track and for each storage area (sector), they can be written by moving the head similarly to the case of writing in ordinary backup and therefore no excess seek time is necessary.

As judgment at step S46 on whether the sending path supports selection processing or not, the judgment processing of steps S42 and S43 on the reading side is executed on the writing side. This processing is necessary in the administration device 43, for example, if some relay device exists at a halfway part on the signal, line 7 in FIG. 1 to indirectly send data through the relay device. However, this processing is not necessary in the administration device 43 in the case of directly sending data through the signal line 7. Judgment at step S46 on whether the writing destination supports selection processing is necessary in the administration device 43 both in the case of indirectly sending data and in the case of directly sending data.

The judgment of whether the sending path to the recording device 42 on the writing side supports communication of the use status information or not may be done by determining whether the administration device 43 has received the storage area use status query request control signal 31, or whether the administration device 43 has received a normal response instead of an error response after sending the storage area use status set request control signal 32 to the recording device 42 on the writing side and acquire in the case of spontaneously performing backup. The judgment of whether the recording device of the writing destination can select and write only data of valid areas or not may share the above-described judgment on the sending path in the case of direct transmission. However, in the case of indirect transmission, the administration device 43 waits for the result of judgment by the relay device existing on the path.

If the sending path to the recording device 42 on the writing side supports communication of the use status information and the recording device of the writing destination can select and write only data of valid areas (YES at S45), the administration device 43 reads the use status information from the use status intermediate storage unit 65 and sends it to the recording device 42 (S47). If the storage area use status set request control signal 32 has not been sent from the administration device 43 to the recording device 42 on the writing side up to this point, the administration device 43 sends this request control signal in advance. The administration device 43 requests the recording device 42 on the writing side to select data with reference to the storage area use status and write the data, using the backup data write request control signal 33 (S48). The administration device 43 executes the data read request control signal 34, selects only data of valid areas from the intermediate data storage unit with reference to the information in the use status intermediate storage unit 65, reads the data, and sends the backup data (S49).

If the sending path from the recording device 41 on the reading side does not support communication of the use status information (NO at S42), or if the recording device of the reading source cannot select and read only data of valid areas (NO at S43), the administration device 43 sends a read request (all data read request) used for ordinary backup to the recording device 41 on the reading side (S50).

Thereafter, the administration device 43 executes processing at steps S51 and S52 similar to the processing at steps S46 and S47. In this case, the recording device 41 on the reading side cannot select only data of valid areas, and all the data is stored in the intermediate data storage unit of the administration device 43. The recording device 42 on the writing side can select only data of valid areas. Since the recording device 41 on the reading side cannot select only data of valid areas, the storage area use status cannot be read from the use status intermediate storage unit 65 of the administration device 43 at the first backup. However, after the administration device 43 receives data at the first backup of data in the data storage unit 12 and the data allocation storage unit 13 of the recording device 41 on the reading side, for example, at the second and subsequent backup, the administration device 43 can uniquely prepare use status information from the received contents, as will be described later at step S56, and the selection processing is thus made possible in the administration device 43. Therefore, the administration device 43 in this case executes the selection processing with reference to the use status information of the storage areas stored in the use status intermediate storage unit 65 (S53), and executes the above-described processing of step S48.

If the sending path to the recording device 42 on the writing side does not support communication of the use status information, or if the recording device of the writing destination cannot select and write only data of valid areas (NO at S46 or NO at S51), the administration device 43 executes the data read request control signal 34, performs selection processing with reference to the use status information read from the use status intermediate storage unit 65 to read data, and sets zero-filled data as data in invalid areas using the information in the use status intermediate storage unit 65 (S54). As described at step S53, the information in the use status intermediate storage unit 65 of the administration device 43 cannot be read at the first backup, but the administration device 43 can uniquely prepare the use status information at the second and subsequent backup.

The administration device 43 requests the recording device 42 on the writing side to write all the data for ordinary backup (S55), and sets information in the use status intermediate storage unit 65 (S56). At step S56, the information in the use status intermediate storage unit 65 of the administration device 43 is prepared in the order for each track and each storage area (sector) in the data storage unit 12 of the recording device 41, on the basis of the data in the data storage unit 12 and the data allocation storage unit 13 of the recording device 41 on the reading side. Then, all the data with zero-filled data set as data in invalid areas is sent as backup data from the administration device 43 to the recording device 42 on the writing side (S49).

The above-described embodiments have the following features in addition to the above-described main features (1) to (3).

(4) The use status storage units 52, 62 of the recording devices 41, 42 store the use status information of each storage area in the form of tables in the order of arrangement of the recording tracks and in the order of arrangement of the storage areas in the data storage units 12, 22.

(5) If the control units 51, 61 of the recording devices 41, 42 receive a read request for backup, the control units 51, 61 send the storage area use status set request control signal 32, which is a request control signal to request setting and storage of use status information, to the writing destination, and thus judge whether the writing destination can perform processing to select and read only data of valid areas using the use status information.

(5-1) Further, if the control units 51, 61 of the recording devices 41, 42 of (5) receive a normal response (accepting the request) instead of an error response as a response to the transmission for judgment and thus learn that the communication partner can perform the processing to select and read, the control units 51, 61 send the use status information in the use status storage units 52, 62 before reading and sending the data from the data storage units 12, 22.

(5-2) If the control units. 51, 61 of the recording devices 41, 42 of (5) receive an error response as a response to the transmission for judgment and thus learn that the communication partner cannot perform the processing to select and read, the control units 51, 61 send zero-filled data as data in invalid areas when reading and sending the data from the data storage units 12, 22.

(6) If the recording device is connected with a signal line enabling direct communication with the recording device of the communication partner and a read request is sent to the communication partner for writing the data for backup; the control units 51, 61 of the recording devices 41, 42 send the storage area use status query request control signal 31, which is a request control signal for requesting sending of use status information, to the communication partner, and thus judges whether the reading source can perform the processing to select and read only data of valid areas using the use stares information.

(5-1) Further, if the control units 51, 61 of the recording devices 41, 42 of(6) receive a normal response (accepting the request) instead of an error response as a response to the transmission for judgment and thus learn that the communication partner can perform the processing to select and read, the control units 51, 61 receive and store the use status information to the use status storage units 52, 62 before receiving data sent from the communication partner and writing it to the data storage units 12, 22. The control units 51, 61 do not write received data of invalid areas, using the use status information in the use status storage units 52, 62. Further, after writing the received data, the control units 51, 61 set and store use status information in the use status storage units 52, 62 on the basis of the received data.

(6-2) If the control units 51, 61 of the recording devices 41, 42 of (6) receive an error response as a response to the transmission for judgment and thus learn that the communication partner cannot perform the processing to select and read only data of valid areas using the use status information, the control units 51, 61 write all the received data without using the use status information in the use status storage units, then set use status information from the received data, and store the use status information.

(7) The use status storage units 52, 62 of the recording devices 41, 42 may be constituted by using non-volatile semiconductor storage devices such as flash memories, or some storage areas in the data storage units 12, 22 which are disk-shaped storage media.

(8) In the case where a recording system is constituted by the plural recording devices 41, 42 and the administration device 43, and at least the recording device 41 on the data reading side at the time of backup can perform the processing to select and read only data of valid areas using the above-described use status information, for example, when backing up data from the recording device 41 to the recording device 42, the administration device 43 sends the storage area use status query request control signal 31, which is a request control signal for requesting sending of the use status information, to the recording device 41 on the data reading side at the time of backup to inquire whether the processing to read only data of valid areas using the use status information is possible or not, which is indicated by a response accepting the request. If the processing to read only data of valid areas is possible, the administration device 43 requests sending of the use status information from the data allocation storage unit 13 before reading and sending the data from the data storage unit 12.

(8-1) If the administration device 43 of (8) can judge that the recording device 41 on the data reading side at the time of backup can perform the processing to read only data of valid areas, the administration device 43 requests the recording device 41 to select and read only data of valid areas using the use status information in the use status storage unit 52, by using the data read request control signal 34. If the administration device 43 cannot judge that the recording device 41 can perform the processing to read only data of valid areas, the administration device 43 requests the recording device 41 to read data of all the storage areas.

(9) In the case of a recording system similar to that of (8), for example, when backing up data from the recording device 41 to the recording device 42, the administration device 43 sends the storage area use status set request control signal 32, which is a request control signal for requesting the recording device on the data writing side to set and store the use status information, to the recording device 42 on the data writing side at the time of backup to inquire whether the processing to read only data of valid areas using the use status information is possible or not, which is indicated by a response accepting the request. If the processing to read only data of valid areas is possible, the administration device 43 sends the use status information before sending data to the recording device 42 on the data writing side.

(9-1) If the administration device 43 of (9) can judge that the recording device 42 on the data writing side at the time of backup can perform the processing to read only data of valid areas, the administration device 43 requests the recording device 42 to select and write only data of valid areas using the use status information in the use status storage unit 62, by using the backup data write request control signal 33. If the administration device 43 cannot judge that the recording device 42 can perform the processing to read only data of valid areas, the administration device 43 requests the recording device 42 to write data of all the storage areas.

(10) In the case of a recording system similar to that of (8), for example, when backing up data from the recording device 41 to the recording device 42 and when the administration device 43 has the use status intermediate storage unit 65 for storing the use status information received from the recording device 41 on the data reading side at the time of backup, if the administration device 43 cannot judge that the recording device 42 on the data writing side at the time of backup can perform the processing to read only data of valid areas, the administration device 43 sends zero-filled data as data of invalid areas when sending the data received from the recording device 41 on the reading side to the recording device 42 on the data writing side.

(10-1) If the recording device 42 on the writing side can perform the processing to read only data of valid areas, the administration device 43 of (10) causes the recording device 42 on the writing side to write data and then sets and stores use status information in the use status storage unit 62 on the basis of that data.

(10-2) In the case of the first backup processing, the administration device 43 of (10) causes the recording device 42 on the writing side to write all the received data without using the use status information in the use status storage unit 62.

(11) In a backup method for a recording device using a recording disk in which, for example, data is backed up from the recording device 41 to the recording device 42 and at least the recording device 41 on the reading side is the one which writes or reads data to or from a recording disk using allocation information of storage areas and stores use status information, when the recording device 41 on the reading side receives a read request for backup, it selects data of only valid areas using the use status information and reads the data.

(11-1) In (11), if the recording device 42 on the writing side at the time of backup can also store use status information and the recording device 41 on the reading side receives a write request for backup, the recording device 41 sends the use status information to the recording device 42 on the writing side before sending the data written on the recording disk.

(11-2) In (11), if the recording device 42 on the writing side at the time of backup does not store use status information and the recording device 41 on the reading side receives a write request for backup, the recording device 41 selects invalid areas using the use status information and sends zero-filled data without reading data of the invalid areas.

(11-3) In (11), if the recording device 42 on the writing side stores use status information and it receives a write request for backup, the recording device 42 selects only valid areas using use status information received in advance and then writes data.

(12) In a backup method for a recording system using a recording disk in which, for example, data is backed up from the recording device 41 to the recording device 42, a recording device which writes or reads data to or from a recording disk using allocation information of storage areas and stores use status information is used at least in the recording device 41 on the reading side at the time of backup, and the recording system has the administration device 43 at a halfway part on a signal line for backup from the recording device 41 to the other recording device 42, when backing up all the data in the recording device 41 on the reading side, the administration device 43 instructs the recording device 41 on the reading side to select and read only data of valid areas using the use status information.

(12-1) In (12), if a recording device storing use status information is also provided in the recording device 42 on the writing side at the time of backup, when backing up all the data in the recording device 41 on the reading side, the administration device 43 instructs the recording device 41 on the reading side to send the use status information to the recording device 42 on the writing side before sending the data written on the recording disk.

(12-2) In (12), if the recording device 42 on the writing side at the time of backup does not use a recording device storing use status information, when backing up all the data in the recording device 41 on the reading side, the administration device 43 instructs the recording device 41 on the reading side to select invalid areas using the use status information and send zero-filled data without reading data of the invalid areas.

(12-3) In (12), if the recording device 42 on writing side at the time of backup also uses a recording device storing use status information, when backing up all the data in the recording device 41 on the reading side, the administration device 43 instructs the recording device on the writing side to select only valid areas using use status information received in advance and write data.

The use status information in the use status storage units 52, 62 or the use status intermediate storage unit 65 can be individually rewritten in accordance with the specified storage area use status set request control signal as described above. It may also be interlocked with an ordinary erase request control signal, and it will be reset when formatting the recording disk.

In the above embodiments, since the use status information is stored in at least the recording device on the reading side, and, if possible, also stored in the recording device on the writing side and the administration device, reading and writing of invalid data such as erased data can be avoided using, the use status information at the time of backup. Therefore, the backup time can be reduced.

As described above, since the use status information is stored in at least the recording device on the reading side and, if possible, also stored in the recording device on the writing side and the administration device, reading and writing of invalid data such as erased data can be avoided using the use status information at the time of backup. Therefore, even if, for example, a recording device using a large-capacity recording disk is used for a long time, the backup time can be reduced.

Also, by providing the use status storage unit in an area such as a maintenance data area other than a user data area used by a host operating system, a non-volatile semiconductor device need not be added and the backup time can be reduced without increasing the cost of the device components.

Also, if the recording device of the communication partner supports the use status information, the storage area use status availability switch request control signal is used to reduce the backup time by referring to the use status information. If the recording device of the communication partner does not support the use status information, the storage area use status availability switch request control signal is used to prevent the processing time for backup from increasing in comparison with the conventional technique, by not referring to the use status information.

What is claimed is:

1. A method of replicating data from a first storage unit to a second storage unit, said method comprising:
    maintaining sector use status information of said first storage unit;
    in response to a backup request, interrogating said sector use status information of said first storage unit;
    based on said sector use status information, selecting data on a valid sector of said first storage unit while not selecting data on an invalid sector of said first storage unit, and selecting data on a valid sector of said first storage unit while setting zero-filled data for an invalid sector of said first storage unit when said second storage unit does not support selection processing; and
    sending said selected data from said first storage unit to said second storage unit.

2. The method of claim 1, wherein said selecting further includes selecting data on a valid sector of said first storage unit while not selecting data on an invalid sector of said first storage unit, based on said sector use status information, when said second storage unit supports selection processing.

3. The method of claim 1, wherein said method further includes sending said selected data and said zero-filled data from said first storage unit to said second storage unit.

4. The method of claim 1, wherein said sector use status information keeps track of sector usage within said first storage unit on a per sector basis.

5. The method of claim 4, wherein said first storage unit includes a plurality of tracks, each track having a plurality of sectors.

6. The method of claim 5, wherein said first storage unit further includes a data allocation storage unit for keeping tracking of how a segment of data is being stored in at least one of said sectors on a track.

7. An apparatus for replicating data from a first storage unit to a second storage unit, said apparatus comprising:
    means for maintaining sector use status information of said first storage unit;
    in response to a backup request, means for interrogating said sector use status information of said first storage unit;
    means for selecting data on a valid sector of said first storage unit while not selecting data on an invalid sector of said first storage unit, based on said sector use status information, and for selecting data on a valid sector of said first storage unit while setting zero-filled data for an invalid sector of said first storage unit when said second storage unit does not support selection processing based on said sector use status information; and means for sending said selected data from said first storage unit to said second storage unit.

8. The apparatus of claim 7, wherein said means for selecting further includes means for selecting data on a valid sector of said first storage unit while not selecting data on an invalid sector of said first storage unit, based on said sector use status information, when said second storage unit supports selection processing.

9. The apparatus of claim 7, wherein said apparatus further includes means for sending said selected data and said zero-filled data from said first storage unit to said second storage unit.

10. The apparatus of claim 7, wherein said sector use status information keeps track of sector usage within said first storage unit on a per sector basis.

11. The apparatus of claim 10, wherein said first storage unit includes a plurality of tracks, each track having a plurality of sectors.

12. The apparatus of claim 11, wherein said first storage unit further includes a data allocation storage unit for keeping tracking of how a segment of data is being stored in at least one of said sectors on a track.

13. A machine-readable medium having a computer program product for replicating data from a first storage unit device to a second storage unit, said computer program product comprising:

program code means for maintaining sector use status information of said first storage unit;

in response to a backup request, program code means for interrogating said sector use status information of said first storage unit;

program code means for selecting data on a valid sector of said first storage unit while not selecting data on an invalid sector of said first storage unit, based on said sector use status information, and for selecting data on a valid sector of said first storage unit while setting-zero-filled data for an invalid sector of said first storage unit when said second storage unit does not support selection processing, based on said sector use status information; and program code means for sending said selected data from said first storage unit to said second storage unit.

14. The machine-readable medium of claim 13, wherein said program code means for selecting further includes program codes means for selecting data on a valid sector of said first storage unit while not selecting data on an invalid sector of said first storage unit, based on said sector use status information, when said second storage unit supports selection processing.

15. The machine-readable medium of claim 13, wherein said machine-readable medium further includes program code means for sending said selected data and said zero-filled data from said first storage unit to said second storage unit.

16. The machine-readable medium of claim 13, wherein said sector use status information keeps track of sector usage within said first storage unit on a per sector basis.

17. The machine-readable medium of claim 16, wherein said first storage unit includes a plurality of tracks, each track having a plurality of sectors.

18. The machine-readable medium of claim 17, wherein said first storage further includes a data allocation storage unit for keeping tracking of how a segment of data is being stored in at least one of said sectors on a track.

* * * * *